(12) United States Patent
Chen et al.

(10) Patent No.: US 12,460,534 B2
(45) Date of Patent: Nov. 4, 2025

(54) MAGNETIC FOCUSING SCHEME FOR FLUX LEAKAGE MEASUREMENT

(71) Applicant: Schlumberger Technology Corporation, Sugar Land, TX (US)

(72) Inventors: Yong-Hua Chen, Cambridge, MA (US); Dzevat Omeragic, Lexington, MA (US); Lin Liang, Cambridge, MA (US); Saad Omar, Cambridge, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/635,193

(22) Filed: Apr. 15, 2024

(65) Prior Publication Data

US 2025/0320810 A1    Oct. 16, 2025

Related U.S. Application Data

(60) Provisional application No. 63/495,366, filed on Apr. 11, 2023.

(51) Int. Cl.
*E21B 47/00* (2012.01)
*G01N 27/85* (2006.01)
*G01R 33/06* (2006.01)

(52) U.S. Cl.
CPC ........... *E21B 47/006* (2020.05); *G01N 27/85* (2013.01); *G01R 33/06* (2013.01)

(58) Field of Classification Search
CPC ........ E21B 47/006; G01N 27/85; G01R 33/06
See application file for complete search history.

(56) References Cited

U.S. PATENT DOCUMENTS 3,317,824 A  *  5/1967  Wood .................. G01N 27/904
                                                         324/221
3,940,689 A     2/1976  Johnson, Jr.
(Continued)

OTHER PUBLICATIONS

Vogtsberger, D.C. et al., "Development of High-Resolution Axial Flux Leakage Casing-Inspection Tools", SPE Eastern Regional Meeting, SPE-97807-MS, Sep. 14, 2005.
(Continued)

*Primary Examiner* — Aaron L Lembo
(74) *Attorney, Agent, or Firm* — Jeffrey D. Frantz

(57) ABSTRACT

A system and apparatus are described for measuring magnetic flux in a wellbore casing. In an example, the apparatus includes a primary magnet and a sensor for measuring magnetic flux in the wellbore casing created by the primary magnet. The primary magnet can have magnetic pole pieces at either end that help guide the magnetic flux into the wellbore casing. Focusing magnets can be placed on both ends of the primary magnet so that the focusing magnets are separated from the primary magnet by the magnetic pole pieces. The magnetic flux created by the focusing magnets reduces dispersion of the primary magnet's magnetic flux by forcing magnetic flux from the primary magnet that would otherwise disperse to flow toward the sensor. The sensor can output a signal with magnetic flux readings. A computing device can receive the signal and detect discontinuities in the wellbore casing.

20 Claims, 7 Drawing Sheets

(56) References Cited

U.S. PATENT DOCUMENTS

| | | | | |
|---|---|---|---|---|
| 5,293,117 | A * | 3/1994 | Hwang | G01N 27/82 |
| | | | | 324/242 |
| 6,924,640 | B2 | 8/2005 | Fickert et al. | |
| 6,967,478 | B2 * | 11/2005 | Wayman | G01N 27/82 |
| | | | | 324/238 |
| 8,165,825 | B2 * | 4/2012 | Legendre | E21B 47/085 |
| | | | | 702/34 |
| 9,512,712 | B2 * | 12/2016 | Donderici | E21B 47/006 |
| 9,624,766 | B2 * | 4/2017 | Draper | E21B 47/113 |
| 9,803,466 | B2 * | 10/2017 | Donderici | E21B 47/007 |
| 9,863,236 | B2 * | 1/2018 | Hanak | E21B 47/092 |
| 10,465,509 | B2 * | 11/2019 | Yao | E21B 47/09 |
| 10,613,244 | B2 * | 4/2020 | Sanmartin | G01V 3/28 |
| 10,883,966 | B2 * | 1/2021 | Zheng | G01R 33/09 |
| 10,901,111 | B2 * | 1/2021 | Donderici | G01V 3/30 |
| 11,656,199 | B2 * | 5/2023 | Chen | G01N 27/83 |
| | | | | 324/220 |
| 11,662,497 | B2 * | 5/2023 | Zheng | G01V 3/38 |
| | | | | 324/346 |
| 2007/0262772 | A1 * | 11/2007 | Rogers | E21B 47/009 |
| | | | | 324/240 |
| 2018/0196005 | A1 * | 7/2018 | Fanini | E21B 47/007 |

OTHER PUBLICATIONS

Sharar, M.A. et al., "High Resolution Casing Imaging Utilizing Magnetic Flux Leakage Measurements", Paper presented at the SPE International Oilfield Corrosion Conference, May 27, 2008.

* cited by examiner

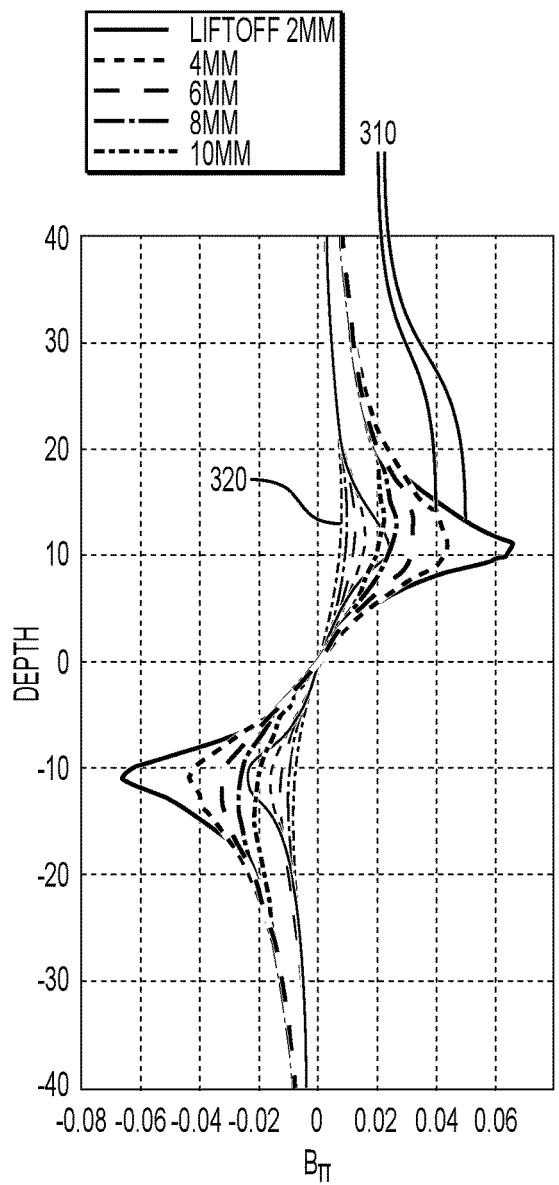
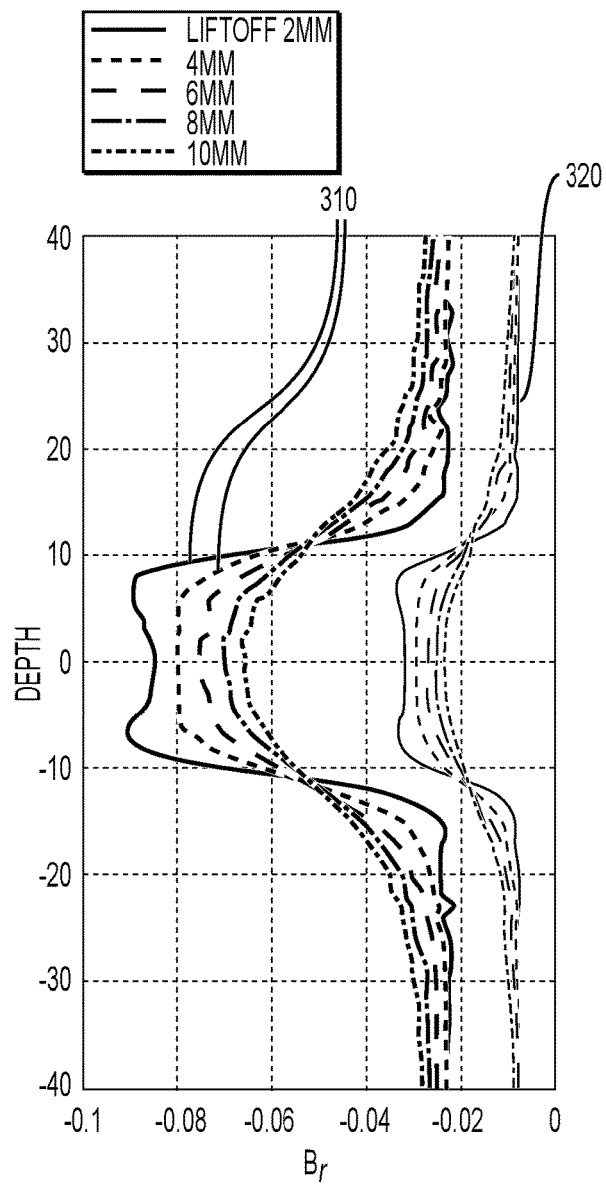
*FIG. 3A*  *FIG. 3B*

MAGNETIC FOCUSING SCHEME FOR FLUX LEAKAGE MEASUREMENT

CROSS REFERENCE TO RELATED APPLICATIONS

This application claims priority to U.S. provisional application No. 63/495,366, titled, "Magnetic Focusing Scheme for Flux Leakage Measurement," filed Apr. 11, 2023, the contents of which are incorporated in their entirety.

BACKGROUND

Magnetic flux leakage ("MFL") tools are widely used for tubular casing inspection in the oil and gas wells. In a typical magnetic flux leakage tool, an axially polarized electromagnet or a permanent magnet is placed at the center of a casing tube to generate a magnetostatic field. Magnetic field sensors are placed near the inner surface of the pipe to detect the variation of the axial and/or radial magnetic field strength due to possible existence of defects in the pipe. To cover the whole azimuth of the casing wall, these sensors are mounted on pads which are pushed mechanically against the casing wall during the measurement. For high azimuthal resolution, multiple pads are used azimuthally and each pad typically contains an array of azimuthally spaced sensors.

Defects in the casing, such as pits and holes, disturb the magnetic flux flow inside the casing and lead to field variation at the sensors. The sensors are generally mounted on pads which are often mechanically propped against the side wall of the casing tube. The magnetic flux flow remains undisturbed if the pipe's shape and properties do not vary along the borehole axis. Presence of local defects such as corroded spots in the casing pipe disturbs the axial flow of the magnetic flux and causes the magnetic flux to leak out of the casing. These leaked fields typically contain all three field components in the axial, radial or normal, and the azimuthal directions.

For accurate and quantitative detection of the defects, especially the small defects, the steel casing needs to be magnetically saturated. In practice, however, it is very difficult to guarantee field saturation in the casing due to the limitation in the magnetic strength of even the strongest magnets given the diversely varying pipe sizes and pipe materials. The tool design, therefore, calls for the strongest magnet available to increase the field strength in the casing and improve the tool sensitivity to the pipe defects.

As a result, a need exists for improved detection of discontinuities in a wellbore casing.

SUMMARY

Examples described herein include systems and methods for an improved magnetic flux leakage apparatus. In an example, the apparatus includes a primary magnet and a sensor for measuring magnetic flux in a wellbore casing created by the primary magnet. The primary magnet may have magnetic pole pieces at either end that help guide the magnetic flux into the wellbore casing. Focusing magnets can be placed above and below the primary magnet, and the focusing magnets are separated from the primary magnet by the magnetic pole pieces. The magnetic flux created by the focusing magnets reduces dispersion of the primary magnet's magnetic flux. For example, without the focusing magnets, some magnetic flux from the primary magnet would normally disperse in the wellbore casing away from the sensor. However, the magnetic flux created by the focusing magnets forces the magnetic flux of the primary magnetic to move toward the sensor. This increases the strength of the measurements taken by the sensor, resulting in improved measurement accuracy and sensitivity. It can also reduce the strength of magnets required for detecting defects.

The system can use of magnetic flux leakage ("MFL") for inspecting wellbore casings in the oil and gas industry. The system can utilize magnets to generate a magnetic field and sensors to detect variations in this field due to defects in the casing.

A primary magnet can be flanked by focusing magnets, which are utilized to direct the magnetic flux more effectively toward the sensors to enhance detection sensitivity and measurement accuracy. The system can address difficulties of achieving magnetic saturation in the steel casing due to limitations in magnet strength, diverse pipe sizes, and materials, highlighting the need for an improved magnetic focusing scheme.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

The system can use the magnets to inspect one casing or multiple casing strings. The inspection of multiple casing strings is made possible by an enhanced magnet focusing scheme designed to generate a stronger magnetic field capable of penetrating multiple casing strings. Prior systems are unable to inspect beyond the first casing string due to insufficient magnetic field strength.

Both the foregoing general description and the following detailed description are exemplary and explanatory only and are not restrictive of the examples, as claimed.

BRIEF DESCRIPTION OF THE DRAWINGS

FIG. 3A is a graph of flux leakage logs representing actual measurements of radial magnetic flux density responses recorded at an array of magnetic field sensors FIG. 3B is a graph of flux leakage logs representing actual measurements of axial magnetic flux density responses recorded at an array of magnetic field sensors

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

A system and apparatus are described for measuring magnetic flux in a wellbore casing. In an example, the apparatus includes a primary magnet and a sensor for measuring magnetic flux in the wellbore casing created by the primary magnet. The primary magnet can have magnetic pole pieces at either end that guide the magnetic flux into the wellbore casing. Focusing magnets can be placed on both ends of the primary magnet so that the focusing magnets are separated from the primary magnet by the magnetic pole pieces. The magnetic flux created by the focusing magnets reduces dispersion of the primary magnet's magnetic flux by forcing magnetic flux from the primary magnet that would otherwise disperse to flow toward the sensor. The sensor can output a signal with magnetic flux readings. A computing device can receive the signal and detect discontinuities in the wellbore casing.

Figure 1:
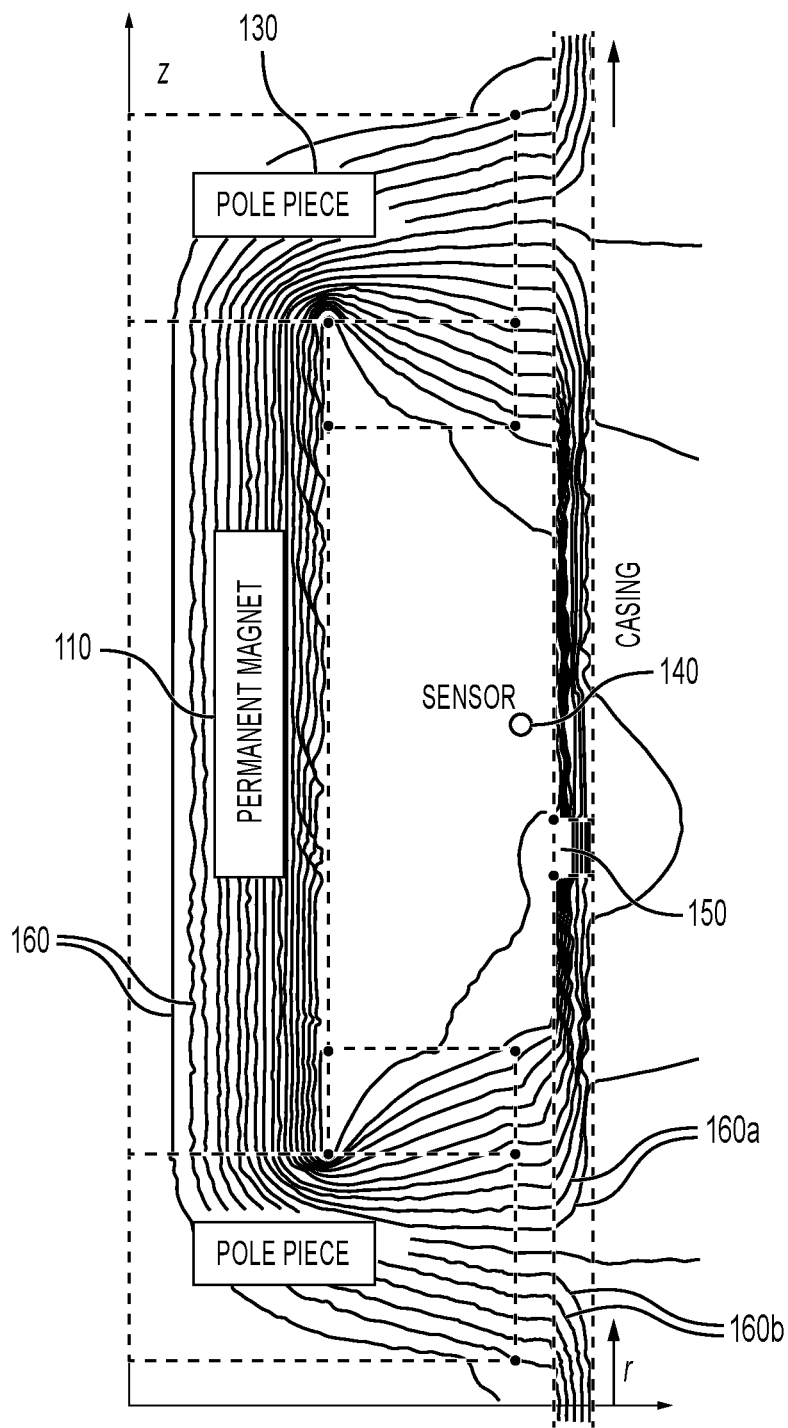
FIG. 1 is a two-dimensional axis-symmetrical diagram illustrating how the magnetic flux lines look like in a typical conventional magnetic flux leakage tool.

FIG. 1 is an example two-dimensional axis-symmetrical diagram illustrating how the magnetic flux lines look like in a typical conventional flux leakage tool. In the diagram, a cylindrical permanent magnet 110 of a finite axial length is placed at the axis-symmetrical center of a casing 120. Pole pieces 130 that can be made of electrical steel are used to guide the magnetic flux towards the metallic casing 120, which closes the loop for a majority of the flux lines produced by the magnet 110 source. The metallic casing 120 can be made of carbon steel, chrome, or other metallic materials. For this magnetostatic modelling, a typical non-linear magnetic flux density-magnetizing force ("B-H") relationship is assumed for the pole pieces 130.

The casing 120 in the model is assumed 10 millimeters ("mm") thick. Most casing is made of approximately 0.3% low carbon steel and a typical nonlinear B-H relationship for casing is assumed in the modeling. However, casing having other thicknesses and materials can also be tested using the systems and methods herein.

Existence of defects, like the defect 150, such as pits and holes in the casing 120, disturb the magnetic flux flow inside the casing 120. Defects such as defect 150 lead to field variation at the sensors 140. The sensor 140 can be mounted on pads, which can be mechanically propped against the side wall of the casing tube 120. The sensors 140 and pads can be positioned around the inner circumference of the casing tube 120 for multiple different readings and for detecting defects across the circumference of the tube 120, in an example. For accurate and quantitative detection of the defects 150, especially the small defects, the steel casing 120 needs to be magnetically saturated. In practice, however, it is very difficult to guarantee field saturation in the casing 120 due to the limitation in the magnetic strength of even the strongest magnets given the diversely varying pipe sizes and pipe materials.

As shown in FIG. 1, the majority of the magnetic flux lines 160 generated by the permanent magnet 110 are guided by the pole pieces 130 into the casing wall 120. However, not all the flux lines form closed loops and flow near the magnetic field sensor 140. For example, a first portion of the magnetic flux lines 160*a* (referred to hereinafter as "converging flux lines 160*a*"), form closed loops and flow near the magnetic field sensor 140. A significant portion of the flux lines 160, although also flowing in loops, flow away from the sensor 140. These diverging flux lines 160*b*, while initially concentrated in the casing 120, gradually disperse into the surrounding medium and have little contribution towards the magnetic flux intensity inside the steel casing 120 near the sensor 140.

As part of correcting these shortcomings, an MFL tool described herein can include opposing magnets above and below the existing source magnet along the axial line. This can force the magnetic flux lines of the MFL tool to flow through the metallic casing and near the sensor. An improved magnet configuration with focusing magnets is shown in FIG. 2.

Figure 2:
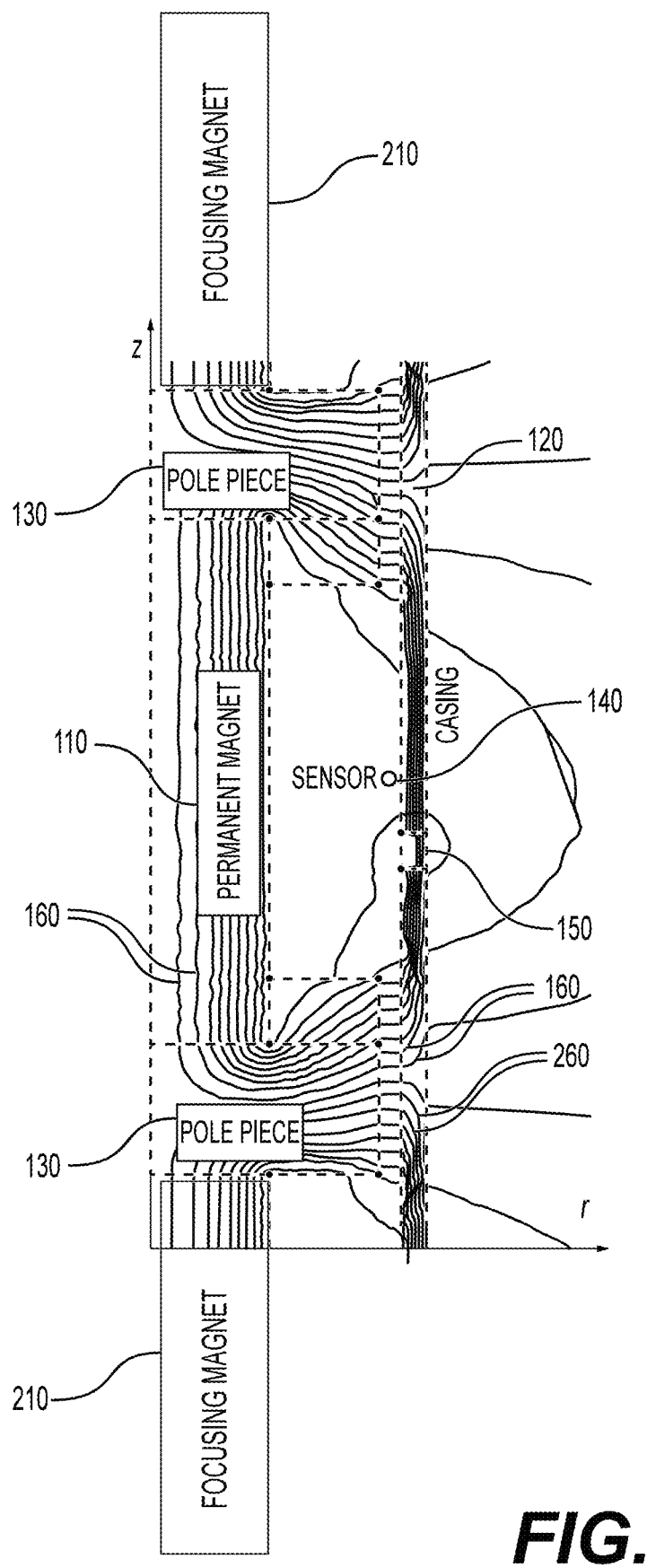
FIG. 2 is a two-dimensional axis-symmetrical diagram illustrating how the magnetic flux lines look like in an improved magnetic flux leakage tool.

FIG. 2 is a two-dimensional axis-symmetrical diagram illustrating magnets of the MFL tool and how the magnetic flux lines look like in an embodiment of the current invention. Focusing magnets 210 are placed above and below the existing source magnet 110 along the axial line of the casing 120. The focusing magnets 210 have their own magnetic flux lines 260. The magnetic flux lines 260 of the focusing magnets 10 force most or all of the magnetic flux lines 160 of the source magnet 110 to flow within the steel casing 120 toward the sensor 140. This results in an increased magnetic field inside the casing 120, which improves the measurement sensitivity of the flux leakage tools.

FIGS. 3A and 3B are example graphs of flux leakage logs representing actual measurements of radial (illustrated in FIG. 3A) and axial (illustrated in FIG. 3B) magnetic flux density responses recorded at an array of magnetic field sensors 140 of the MFL tool, with varying liftoff values. Liftoff values refer to the distance between the magnetic field sensors and the surface of the casing or pipe being inspected. This distance can impact the accuracy and sensitivity of the MFL readings. The magnetic flux density responses can be recorded as the MFL tool moves across the side of a rectangular pit on the inner surface of the metallic casing, such as pit 150 in FIG. 2.

In the example of FIGS. 3A and 3B, the pit has a dimension of 20 mm in vertical length and 5 mm in radial depth. Since FIGS. 3A and 3B are 2-dimensional axis-symmetrical models, the pit is in the shape of a ring. This can indicate that the pit is a ring-shaped corrosion in the casing.

The liftoff value is the radial distance between the sensor 140 and the surface of the steel casing 120. The existence of non-zero liftoff reflects various types of limitations and imperfections preventing the sensors 140 being placed right next to the casing surface. Two sets of logging curves are shown.

The logging curves in dashed lines 320 are flux leakage responses without the focusing magnets 210 while the logging curves in solid lines 310 are flux leakage responses with the added focusing magnets 210. The logging responses in FIGS. 3A and 3B show that the added focusing magnets 210 significantly and consistently increase the magnetic field intensity at the sensors 140 regardless of the sensor liftoff. The graphs shown in FIGS. 3A and 3B illustrate how introduction of the focusing magnets 210 improves the sensitivity of the flux leakage measurements and increases the data quality and reliability.

As illustrated, by using the focusing magnets 210 in the configuration shown in FIG. 2, the magnetic field of the primary magnet 110 propagates more strongly through the pole pieces and into the metal casing. This results in the higher amplitude readings 310, enhancing the system's ability to detect discontinuities in the casing.

For high resolution corrosion imaging, it is desireable to place as many sensors as possible into each of the imaging pads. Axially, radially, and azimuthally polarized magnetic field sensors could all be included to measure all three field components. Due to the spatial limitation, a single set of imaging pads may not be able to hold all the magnetic field sensors.

Figure 4:
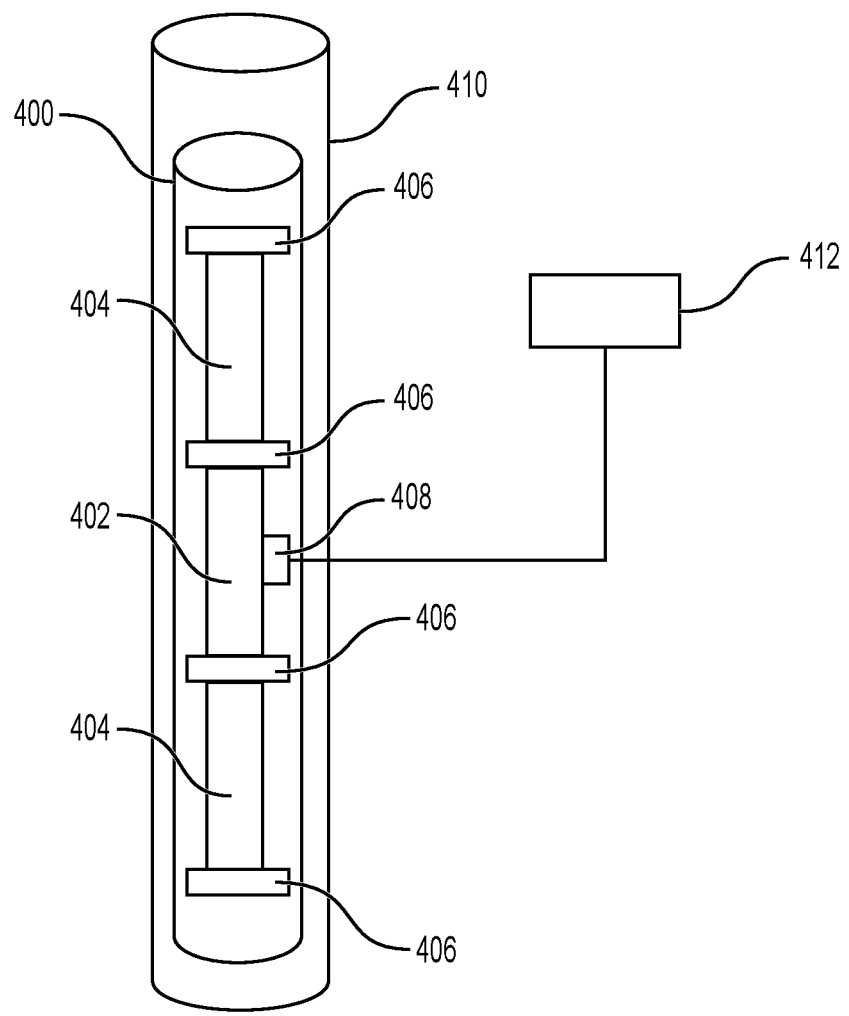
FIG. 4 is an example system for detecting discontinuities on or below a surface of a wellbore casing.

FIG. 4 is an example system for detecting discontinuities on or below a surface of a wellbore casing 410. A housing or support 400 can be inserted inside a wellbore casing 410. The housing 400 includes a primary magnet 402. Magnetic pole pieces 406 are positioned at either end of the primary magnet 402 and help guide magnetic flux created by the primary magnet 402 towards the wellbore casing 410. Focusing magnets 404 are positioned at either end of the primary magnet 402, and the focusing magnets 404 are separated from the primary magnet 402 by magnetic pole pieces 406. Magnetic pole pieces 406 can be optionally placed at the ends of the focusing magnets 404 as well. The focusing magnets 404 can cause the magnetic flux created by the primary magnet 402 to flow toward a magnetic sensor 408. The magnetic sensor 408 can be one or more sensors that can detect and measure magnetic fields. The magnetic sensor 408 is positioned radially opposite the primary magnet 402. In one example, the housing 400 can leave the magnetic poles 406 and magnetic sensor 408 exposed to the inner surface of the wellbore casing 410.

The magnetic sensor 408 can be part of an array of sensors on pads. Sensor 408 can be one or more sensors positioned around the interior or exterior of the MFL tool 400. The magnetic sensors 408 can provide measurements to a data processing system 412.

The data processing system 412 can be one or more processor-based devices that evaluate data from the magnetic sensors 408. For example, the data processing system 412 can be a computer, server, or a virtual computing platform. The data processing system 412 can be located on-site or at a remote location. The data processing system 412 can include a graphical user interface ("GUI") for displaying data related to conditions of the wellbore casing 410. The data processing system 412 can analyze the measurements from the magnetic sensor 408 to identify any defects in the wellbore casing 410. For example, casing defects can cause discontinuities in the magnetic field created by the primary magnet 402. The data processing system 412 can detect such discontinuities in the data to identify defects in the wellbore casing 410. The magnetic fields created by the focusing magnets 404 can cause an increase in the magnetic flux from the primary magnet 402 that flows to the sensor 408. This increases the strength of the measurements taken by the sensor 408, resulting in improved measurement accuracy and sensitivity. It can also reduce the strength of magnets required for detecting defects.

In one example, the GUI displays graphs of the magnetic flux response, such as those shown in FIGS. 3A, 3B, 6, and 7. Additionally, machine learning models or artificial intelligence algorithms can be trained to read the graphs and alert the user to detected pits, deformations, and other corrosion features detected in the casing.

With the enhanced magnet focusing scheme, a user can inspect multiple strings of casings for casing corrosion, casing deformation, and eccentricity. The MFL tool can be used for well integrity measurements and evaluation for multiple casing strings.

For high resolution corrosion imaging, it is desirable to place as many sensors as possible into each of the imaging pads. Axially, radially, and azimuthally polarized magnetic field sensors can all be included to measure all three field components. However, due to the spatial limitation, a single set of imaging pads may not be able to hold all the magnetic field sensors. Additional magnets can be added to either end of the magnet configuration shown in FIG. 2 to form a new magnet configuration shown in FIG. 5.

Figure 5:
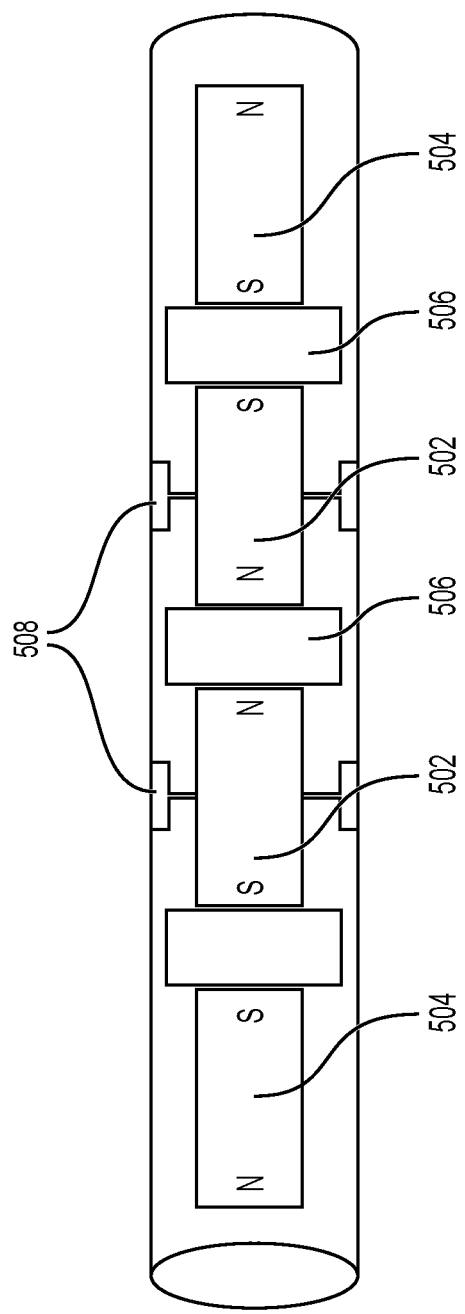
FIG. 5 is an example illustration of a magnet configuration that can be used in the system.

FIG. 5 is an example illustration of a magnet configuration that can be used in the system. The configuration in FIG. 5 adds an extra focused source magnet 502 such that additional set of sensor pads 508 can be placed. In other words, two focused source magnets 502 can be used instead one. The first and the last magnets 504 can act purely as the focusing magnets. The magnets 508 in between the first and the last magnets act not only as the source magnets but also as the focusing magnets.

As shown, the source magnets 502 can be axially aligned with reverse polarity. In the example of FIG. 5, the N polarity is towards the center, separated by a magnetic pole piece 506. Similarly, the focus magnets 504 can be radially aligned with the source magnets 502 and in reverse polarity. In this example, this means that the S pole of the focus magnets 504 is adjacent to the S pole of the respective source magnet 502. These poles are separated by magnetic pole pieces 506.

This magnet focusing scheme can significantly increase the magnetic field intensity and makes it possible for us to inspect the multiple casing strings.

Figure 6:
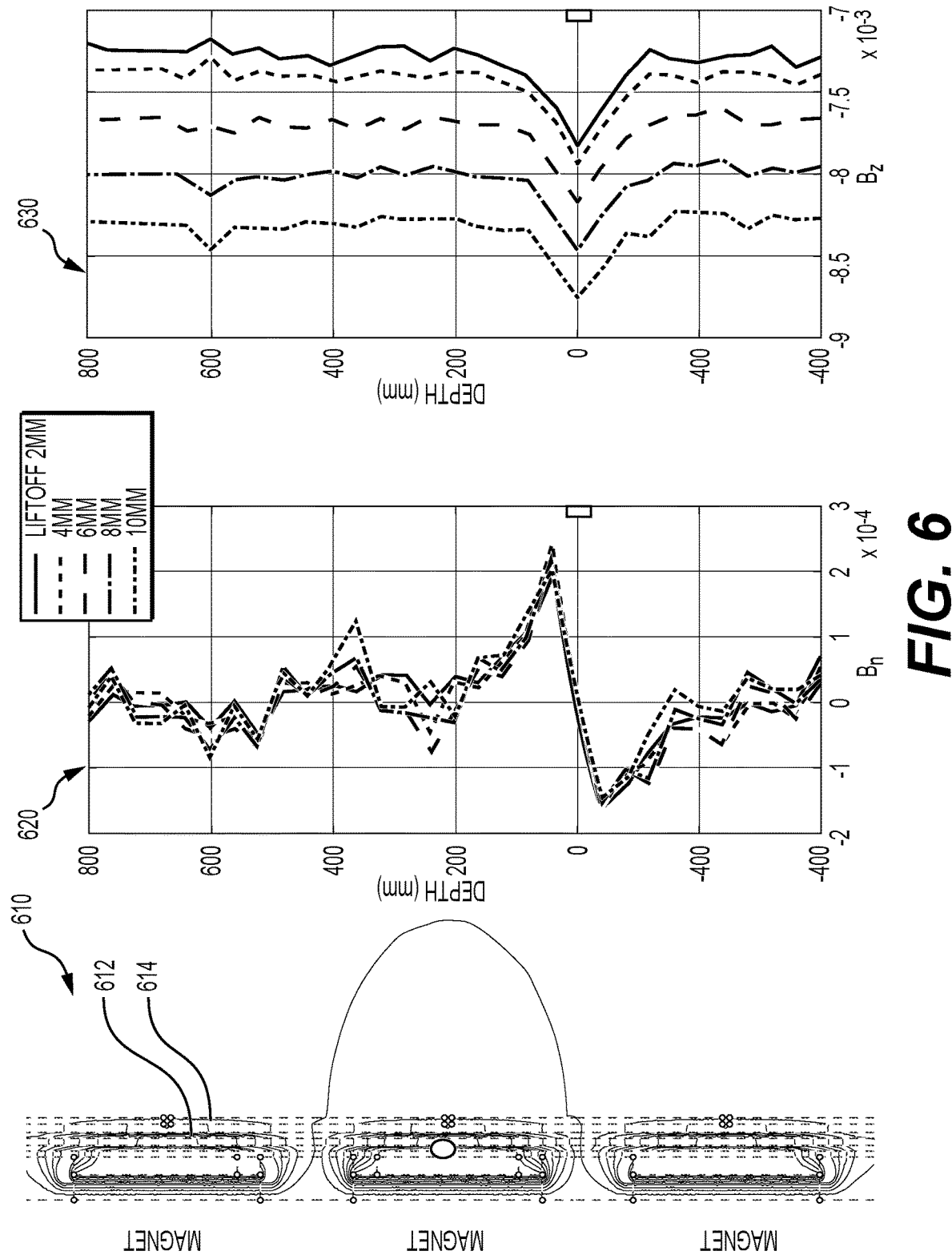
FIG. 6 is an example illustration of a magnet configuration for inspecting two casing strings, with example MFL logs.
Figure 7:
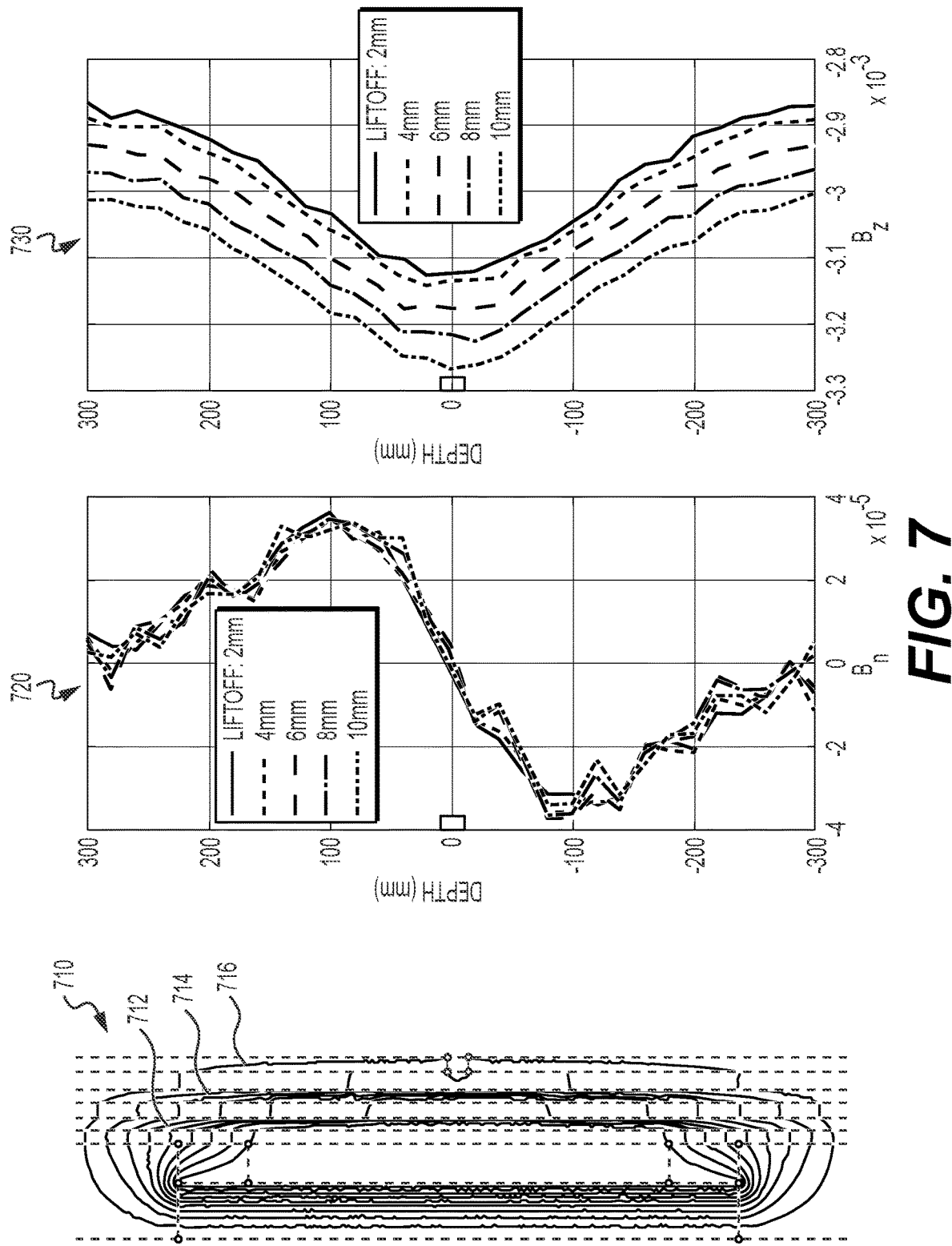
FIG. 7 is an example illustration of a magnet configuration for inspecting three casing strings, with example MFL logs.

FIGS. 6 and 7 illustrate two examples of using the MFL tool with a focusing scheme of FIG. 5 to inspect multiple strings of casings at once. The improved power and focus of the magnetic field, along with increased sensors due to the additional space, can allow for analyzing the multiple casing strings.

FIG. 6 is an example illustration of a magnet configuration 610 for inspecting two casing strings 612, 614, with example MFL logs 620, 630. In this example, a first casing 612 can have an inner diameter of 7.725 inches, an outer diameter is 8.625 inches, with a 11.43 millimeter ("mm") thickness. The second casing 614 has a 9.76 inch inner diameter and a 10.75 outer diameter, with a 12.57 mm thickness. The pit can be 5 mm by 20 mm, and located on the insider surface of the second casing string 614.

In one example, the magnets of the assembly 610 can be sized to include a two inch radial width and 12 inch axial length. The circle next to the center magnet in the assembly 610 can indicate a sensor location.

In FIG. 6, the flux leakage logs 620, 630 show that the improved MFL method is able to detect the defect on the second casing string. The example graphs 620, 630 of flux leakage logs representing actual measurements of radial (graph 620) and axial (graph 630) magnetic flux density responses recorded at an array of magnetic field sensors of the MFL tool, with varying liftoff values. The magnetic flux density responses can be recorded as the MFL tool moves across the side of a first metallic casing 612 in a location that corresponds to the pit in the second metallic casing 614.

The logs 620, 630 are two-dimensional axis-symmetrical models. The readings indicate that the pit is a ring-shaped corrosion in the second casing 630. In one example, the pit can be distinguished as on the second casing 614 and not the first casing 612 based on the signal being weaker (signal attenuation) and the shape of the signal pattern of the different liftoff values. The MFL data can be compared against baseline measurements in the context of known casing configurations. For example, this can allow for a comparative depth analysis of changes in the MFL data. Applying advanced data processing and inversion techniques can help model the source of the flux leakage, potentially distinguishing between defects in inner and outer casings 612, 614 based on the expected magnetic flux distribution.

FIG. 7 is an example illustration of a magnet configuration 710 for inspecting three casing strings 712, 714, 716, with example MFL logs 720, 730. In the example of FIG. 7, a defect is detected on the third casing 716.

The example of FIG. 7 is based on a first casing 712 having an inner diameter of 7.725 inches and an outer diameter of 8.625 inches. A second casing 714 includes an inner diameter of 9.76 inches and an outer diameter of 10.75 inches. A third casing 716 has an inner diameter of 12 inches and an outer diameter of 13.09 inches. The casings 712, 714, 716 are all made form SAE1030 low carbon steel.

The magnet in the magnet configuration 710 includes a two-inch radial width and a 20-inch axial length.

A pit that is 5 mm by 20 mm is detected in the MFL logs 720, 730. The pit is located in the third casing string 716.

To detect a pit or other irregularity in an outer casing of multiple concentric casings, as is shown in both FIGS. 6 and 7, can involve interaction of magnetic field strength, penetration depth, and the sensitivity of the detection system. The MFL tool can use high strength magnets with the focused configuration of either of FIGS. 4 and 5. The magnetic source can have sufficient strength to saturate all three casing strings. This can involve strong permanent magnets or electromagnets optimized for deep penetration.

By employing the focusing magnets and magnetic pole pieces, the magnetic field can be directed radially outward, enhancing the ability to detect irregularities in the outer casings. A multi-dimensional sensor array, including axial, radial, and circumferential sensors, can capture a comprehensive magnetic signature of the casings.

The MFL tool can be calibrated to saturate the multiple casings. When the MFL tool is deployed into the wellbore, it can be operated at a power level designed to saturate, for example, a third outer concentric casing, such as in FIG. 7. As the MFL tool passes an area of interest, the sensor array collects magnetic flux leakage data. Due to the depth and potential attenuation of the signal, the data is expected to show subtle variations indicative of defects in a particular one of the concentric casings.

Inversion algorithms can be applied to the collected data that take into account the different magnetic properties of the different casings, the geometry of the well, and the expected signal attenuation through the casings to estimate the depth of the detected defect. The analysis can reveal a localized anomaly in the magnetic field. For example, the anomaly can be consistent with a 5 mm by 20 mm pit, differentiated from the background and from any potential anomalies in the first and second casings.

The sensors can differentiate between normal and defect-induced magnetic flux variations. The sensor technology can include Hall effect sensors and magneto-resistive sensors, which convert magnetic flux changes into electrical signals that are interpreted by the system.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A magnetic flux measurement apparatus for detecting discontinuities on or below a surface of a magnetizable material comprising, comprising:
   a first magnet carried on a support, the first magnet operable to generate a first magnetic field, wherein the first magnet is a first source magnet;
   a second magnet carried on the support adjacent a first end of the first magnet;
   a third magnet carried on the support adjacent a second end of the first magnet, the second end being opposite the first end, wherein the second and third magnets operate to focus the first magnetic field of the magnet radially outward into the material; and
   a sensor, carried on the support, that detects a magnetic flux leakage of the first magnetic field from the material and produces a corresponding output signal.

2. The apparatus of claim 1, further comprising:
   a first magnetic pole piece carried on the support between the first end of the first magnet and the second magnet; and
   a second magnetic pole piece carried on the support between the second end of the first magnet and the third magnet.

3. The apparatus of claim 1, further comprising a fourth magnet adjacent to the second magnet, wherein the second magnet is operable to generate a second magnetic field, wherein the fourth magnet focuses the second magnetic field of the second magnet radially outward into the material, and wherein the second magnet is a second source magnet.

4. The apparatus of claim 3, wherein a first sensor array including the first sensor is positioned radially from the first magnet, a second sensor array is positioned radially from the second magnet, and wherein the second sensor array is configured to detect a magnetic flux leakage of the second magnetic field from the material and produces a corresponding output signal.

5. The apparatus of claim 4, wherein magnetic pole pieces are placed between the fourth and second magnets, the second and first magnets, and the first and third magnets.

6. The apparatus of claim 5, wherein the fourth magnet has reversed polarity compared to the second magnet, the second magnet has reversed polarity compared to the first magnet, and the first magnet has reversed polarity compared to the third magnet.

7. The apparatus of claim 1, further comprising a computing device that detects the presence of discontinuities in the material based on the output signal from the sensor and generates data on the discontinuities.

8. The apparatus of claim 7, wherein the computing device outputs first and second graphs of flux leakage logs, wherein the first graph includes measurements of radial magnetic flux and the second graph includes measurements of axial magnetic flux.

9. A system for detecting discontinuities on or below a surface of a magnetizable material, comprising:
   a magnetic flux measurement apparatus, comprising:
      a first magnet carried on a support for generating a first magnetic field that extends radially outward into the material,
      a second magnet carried on the support adjacent a first end of the first magnet,
      a third magnet carried on the support adjacent a second end of the first magnet, the second end being opposite the first end, and a sensor, carried on the support, that detects magnetic flux leakage of the first magnetic field from the material and produce a corresponding output signal; and a computing device that receives the output signal from the sensor and identifies defects in a wellbore casing based on the output signal.

10. The system of claim 9, the magnetic flux measurement apparatus further comprising:

a first magnetic pole piece carried on the support between the first end of the first magnet and the second magnet; and a second magnetic pole piece carried on the support between the second end of the first magnet and the third magnet.

11. A method for detecting discontinuities on or below a surface of a magnetizable material, comprising:

lowering a magnetic flux leakage ("MFL") tool into a wellbore, the MFL tool comprising:

at least one source magnet flanked on opposite sides by first and second focusing magnets, respectively;

a different magnetic pole piece between each of the at least one source magnet and first and second focusing magnets; and a sensor array including sensors on pads;

positioning at least some of the pads against an inner wall of a first casing in the wellbore, wherein the sensors produce output signals that represent a measurement of at least one component of a magnetic flux leakage of the at least one source magnet; and receiving the output signals at a computing device.

12. The method of claim 11, wherein the magnets of the at least one source magnet and first and second focusing magnets each alternate in polarity compared to adjacent magnets.

13. The method of claim 11, wherein the at least one source magnet is two source magnets.

14. The method of claim 11, wherein the output signals indicate an abnormality in the inner wall of the first casing.

15. The method of claim 11, wherein the first casing is concentrically contained within a second casing, and wherein the output signals indicate an abnormality in the second casing.

16. The method of claim 11, further comprising detecting, with the computing device, a presence of casing discontinuities based on the output signals from the sensor array.

17. The method of claim 16, wherein the at least one component is a radial component and an axial component of the magnetic flux, wherein the computing device outputs first and second graphs of flux leakage logs, wherein the first graph includes measurements of the radial component of the magnetic flux and the second graph includes measurements of the axial component of the magnetic flux.

18. The method of claim 17, wherein the first casing is concentrically located inside of a second casing and a third casing, and wherein the measurements of the radial component of the magnetic flux and the axial component of the magnetic flux indicate a discontinuity in the third casing.

19. The method of claim 17, wherein the first casing is concentrically located inside of a second casing and a third casing, and wherein the radial magnetic flux and axial magnetic flux indicate a discontinuity in the second casing.

20. The method of claim 17, wherein the first casing is disposed within at least one outer casing, the method further comprising determining, with the computer device, which casing includes an abnormality based on the output signals.

* * * * *